United States Patent
Zhang (10) Patent No.: US 9,661,055 B2
(45) Date of Patent: *May 23, 2017

(54) METHOD AND SYSTEM FOR REDIRECTING A CLIENT

(71) Applicant: Huawei Technologies Co., Ltd., Shenzhen (CN)

(72) Inventor: Tao Zhang, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 540 days.

This patent is subject to a terminal disclaimer.

(21) Appl. No.: 14/154,662

(22) Filed: Jan. 14, 2014

(65) Prior Publication Data

US 2014/0129610 A1 May 8, 2014

Related U.S. Application Data

(63) Continuation of application No. 11/880,346, filed on Jul. 20, 2007, now Pat. No. 8,667,143, which is a (Continued)

(30) Foreign Application Priority Data

Nov. 10, 2005 (CN) .......................... 2005 1 0115885

(51) Int. Cl.
  *G06F 15/16* (2006.01)
  *H04L 29/08* (2006.01)
  *H04L 29/06* (2006.01)

(52) U.S. Cl.
  CPC .......... *H04L 67/02* (2013.01); *H04L 63/0892* (2013.01); *H04L 63/10* (2013.01)

(58) Field of Classification Search
  CPC ................................................. H04L 63/0892
  (Continued)

(56) References Cited

U.S. PATENT DOCUMENTS 5,644,720 A 7/1997 Boll
6,768,743 B1 7/2004 Borella et al.
(Continued)

FOREIGN PATENT DOCUMENTS

CN 1538706 A 10/2004
CN 1581114 A 2/2005
(Continued)

OTHER PUBLICATIONS

Baggio, A., et al., "Transparent Distributed Redirection of HTTP Requests," Department of Computer Science, Proceedings of the Second IEEE International Symposium on Network Computing and Applications (NCA'03), Apr. 16-18, 2003, 8 pages.
(Continued)

*Primary Examiner* — Imad Hussain
(74) *Attorney, Agent, or Firm* — Huawei Technologies Co., Ltd.

(57) ABSTRACT

A method and a system for redirecting a client are disclosed, the method including: sending by the client a request message to a redirect agent; returning by the redirect agent a first response message to the client, an identification of a second realm being carried in the first response message; sending by the client the request message to a second server in the second realm. The data are maintained and modified only on the redirect agent, so that the redirection service between different realms may be realized without upgrading or maintaining the client. In addition, because the number of redirect agents is much smaller than the number of clients, the operation and maintenance costs may be reduced greatly.

18 Claims, 5 Drawing Sheets

Related U.S. Application Data continuation of application No. PCT/CN2006/001836, filed on Jul. 25, 2006.

(58) Field of Classification Search
USPC .................................................. 709/227, 201
See application file for complete search history.

(56) References Cited

U.S. PATENT DOCUMENTS

| | | | |
|---|---|---|---|
| 6,799,214 B1* | 9/2004 | Li | G06F 17/30902 707/E17.12 |
| 6,829,473 B2 | 12/2004 | Raman | |
| 6,915,345 B1* | 7/2005 | Tummala | H04L 63/0428 455/432.1 |
| 6,954,456 B2 | 10/2005 | Cranor et al. | |
| 7,080,158 B1 | 7/2006 | Squire | |
| 7,103,640 B1 | 9/2006 | Overton et al. | |
| 7,266,100 B2* | 9/2007 | Le | H04L 63/0892 370/278 |
| 7,284,055 B1 | 10/2007 | Oehrke et al. | |
| 7,392,325 B2 | 6/2008 | Grove et al. | |
| 7,509,422 B2 | 3/2009 | Jaffray et al. | |
| 7,624,184 B1 | 11/2009 | Aviani et al. | |
| 7,647,424 B2 | 1/2010 | Kim et al. | |
| 7,761,500 B1 | 7/2010 | Eckert et al. | |
| 2002/0002622 A1 | 1/2002 | Vange et al. | |
| 2002/0069241 A1* | 6/2002 | Narlikar | H04L 29/06 709/203 |
| 2003/0076841 A1 | 4/2003 | Boxall et al. | |
| 2003/0112792 A1* | 6/2003 | Cranor | H04L 67/1034 370/352 |
| 2003/0177162 A1 | 9/2003 | Staiger et al. | |
| 2003/0177274 A1* | 9/2003 | Sun | G06F 17/30861 719/310 |
| 2004/0230831 A1 | 11/2004 | Spelman et al. | |
| 2005/0088971 A1* | 4/2005 | Qing | H04L 67/16 370/230 |
| 2005/0235065 A1* | 10/2005 | Le | H04L 63/0227 709/238 |
| 2006/0067338 A1 | 3/2006 | Hua et al. | |
| 2006/0077926 A1* | 4/2006 | Rune | H04L 45/34 370/328 |
| 2006/0153135 A1* | 7/2006 | Ascolese | H04L 12/5692 370/331 |
| 2006/0242320 A1* | 10/2006 | Nettle | H04L 67/1019 709/245 |
| 2007/0118667 A1 | 5/2007 | McCarthy et al. | |
| 2007/0283026 A1 | 12/2007 | Lohmar et al. | |
| 2008/0288458 A1 | 11/2008 | Sun et al. | |
| 2009/0019106 A1 | 1/2009 | Loupia | |
| 2012/0177028 A1* | 7/2012 | Mo | H04L 12/1407 370/351 |

FOREIGN PATENT DOCUMENTS

| | | |
|---|---|---|
| EP | 1655919 A1 | 5/2006 |
| WO | 0180003 A2 | 10/2001 |

OTHER PUBLICATIONS

Cardellini, V., et al., "Redirection Algorithms for Load Sharing in Distributed Web-Server Systems," Proceedings 19th IEEE International Conference on Distributed Computing Systems, 1999, 8 pages.

Gupta, S., et al., "A Client Oriented, IP Level Redirection Mechanism," INFOCOM '99, 18th Annual Joint Conference of the IEEE Computer and Communications Societies, vol. 3, Mar. 21-25, 1999, pp. 1461-1469.

Liu, J., et al., "Introduction to Diameter, Get the Next Generation AAA Protocol," IBM, https://www.ibm.com/developerworks/library/wi-diameter/, Jan. 24, 2006, 11 pages.

Suryanarayanan, K., et al., "Performance Evaluation of New Methods of Automatic Redirection for Load Balancing of Apache Servers Distributed in the Internet," Proceedings 25th Annual IEEE Conference on Distributed Computing Systems, LCN 2000, pp. 644-651.

Zhifeng, Z., et al., "IP Telephony System and Call Routing, Part V Call Routing of SIP IP Telephony System," Chinese Data Communications, Institute of Communication Engineering of PLA University of Science and Technology, 10 pages.

Zhifeng, Z., et al., "IP Telephony System and Call Routing, Part V Call Routing of SIP IP Telephony System," English Translation, Institute of Communication Engineering of PLA University of Science and Technology, 10 pages.

Hewlett-Packard, "Introduction to Diameter," White Paper, www.docs.hp.com, Manufacturing Part No. T1428-90011, Sep. 2002, 22 pages.

Tsou, T., et al., "Realm-Based Redirection in Diameter," draft-tsou-dime-realm-based-redirect-01, Internet Draft, Updates RFC 3588, Jul. 14, 2009, 5 pages.

Calhoun, P., et al., "Diameter Base Protocol," RFC 3588, Sep. 2003, 147 pages.

Foreign Communication From a Counterpart Application, Chinese Application No. 200680011789.4, Chinese Office Action dated Dec. 9, 2010, 5 pages.

Foreign Communication From a Counterpart Application, European Application No. 06761566.6, Extended European Search Report dated Jan. 23, 2008, 4 pages.

Foreign Communication From a Counterpart Application, Chinese Application No. PCT/CN2006/001836, Chinese Search Report dated Nov. 23, 2006, 6 pages.

Foreign Communication From a Counterpart Application, Chinese Application No. PCT/CN2006/001836, English Translation of Chinese Written Opinion dated Nov. 23, 2006, 3 pages.

Office Action dated Aug. 16, 2010, 56 pages, U.S. Appl. No. 11/880,346, dated Jul. 20, 2007.

Office Action dated Feb. 3, 2010, 18 pages, U.S. Appl. No. 11/880,346, dated Jul. 20, 2007.

Office Action dated Jul. 23, 2009, 18 pages, U.S. Appl. No. 11/880,346, dated Jul. 20, 2007.

Office Action dated Mar. 18, 2013, 12 pages, U.S. Appl. No. 11/880,346, dated Jul. 20, 2007.

Office Action dated Aug. 22, 2012, 31 pages, U.S. Appl. No. 11/880,346, dated Jul. 20, 2007.

Office Action dated Dec. 27, 2011, 26 pages, U.S. Appl. No. 11/880,346, dated Jul. 20, 2007.

Office Action dated Mar. 10, 2011, 65 pages, U.S. Appl. No. 11/880,346, dated Jul. 20, 2007.

Notice of Allowance dated Oct. 16, 2013, 16 pages, U.S. Appl. No. 11/880,346, dated Jul. 20, 2007.

* cited by examiner

METHOD AND SYSTEM FOR REDIRECTING A CLIENT

CROSS-REFERENCES TO RELATED APPLICATIONS

This application is a continuation of U.S. patent application Ser. No. 11/880,346, filed on Jul. 20, 2007, which is a continuation of International Application No. PCT/CN2006/001836, filed on Jul. 25, 2006, which claims priority to Chinese Patent Application No. 200510115885.0, filed on Nov. 10, 2005. The aforementioned patent applications are hereby incorporated by reference in their entireties.

FIELD

The present invention relates to communication field, and more particularly to a method and a system for redirecting a client.

BACKGROUND

In communication field, "AAA" refers to Authentication, Authorization and Accounting. From the birth of communication networks, the authentication, authorization and accounting mechanism has become the foundation for operation of the communication networks. The use of various resources in the networks has to be managed through authentication, authorization and accounting. For a commercial system, authentication is vital, because the exact person who should be charged for service provision can be ascertained and illegal users (hackers) can be prevented from attacking the network only when the user's identity is confirmed. After the user's identity is confirmed, the system can grant the user corresponding authority according to the service category requested by the user when the user opens his/her account. Finally, when the user uses resources of the system, an appropriate device is required to perform statistics on the user's occupation of resources, and charge the user according to the statistics. In existing schemes, operators set an appropriate server for clients to perform the above management.

In practical management, due to various reasons, there often occur cases in which a client requires changing the server assigned for it by the system. At present, Diameter protocol is employed to handle related server changes and assign a different server for the client, i.e., to perform a redirection operation. Diameter messages can be routed via a Redirect Agent. In Diameter protocol, Remote Authentication Dial In User Service (RADIUS) can be translated into a new generation of AAA protocol, i.e., RADIUS*2=Diameter. In Diameter protocol, there are defined relevant Network Elements (NEs), including client, server and agent.

Figure 1:
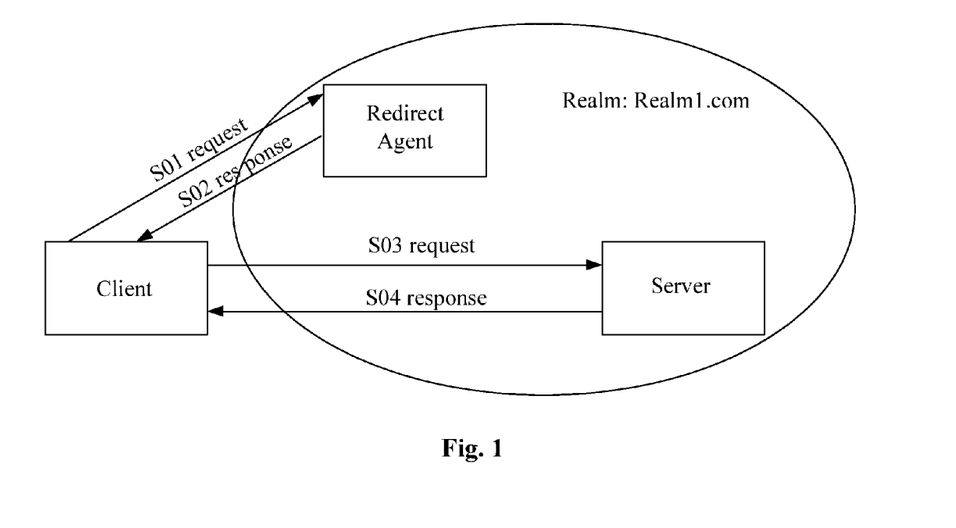
FIG. 1 is a schematic flow chart of client redirection in the prior art.

FIG. 1 shows a process of client redirection. As shown in FIG. 1, the redirection process mainly includes the steps as follows.

In Step S01, a client sends a request message to a redirect agent.

In Step S02, the redirect agent returns a response message to the client to tell the address of a redirected server.

For example, the content of a redirect response message for authorization and authentication is as follows:

```
<AAA>   ::= < Diameter Header: 275, PXY > //content of Diameter
header: "275", the command code; "PXY", indicating the message is
proxiable
    < Session-Id > //indicating the session identifier, which is a copy
        of the session identifier in the request
    { Result-Code } //having a value of "3006" which indicates a
        redirect response
    { Origin-Host } //the name of the host from which this response is
        returned
    { Origin-Realm } //the name of the realm from which this response
        is returned
    {   Redirect-Host   } //the name of the server to be redirected to,
e.g., Server1.china.com
```

In Step S03, the client sends a request to the server according to the address of server carried in the response from the redirect agent;

In Step S04, the server handles the request from the client and returns a response to the client.

In the above scheme, servers are managed on realm basis, and route data may be maintained centrally by the redirect agent without being maintained on multiple clients. The existing redirect agent can return the address of a server in the origin realm but can't return a new realm name; therefore, it can be redirected to a server in the current realm but can't be redirected to a server in a new realm. As shown in FIG. 1, both the redirect agent and the server have to be in the same realm: Realm1.com. That is because the routing method is carried as first, routing according to the information of the realm and then routing through the server in the realm. For example, when the client makes a routing in the realm China Mobile, it sends a message to the agent of the realm China Mobile according to the name of the realm (China Mobile); then, the agent in the realm China Mobile determines the service belongs to Beijing Mobile according to the server name.

In today's communication management, there often occur cases in which a client has to be redirected to other realms and servers. For example, an operator (with a realm name) may want to stop a service and hope all of his customers are redirected by a redirect agent to another operator (with another realm name) so as to continue the provision of the service without affecting the services for his customers. Because the existing redirect interface doesn't support redirection between different realms, all clients have to be upgraded so that the clients can send a request message to a new realm. That requires modifying the realm information originally configured on each client to information of the new realm. With the existing scheme, such an upgrade and maintenance will cause heavy workload, because there are usually a huge number of clients.

SUMMARY

An embodiment of the present invention provides a method for redirecting a client. The method includes: sending, by the client, a request message to a redirect agent, the client is directed to a first server in a first realm; receiving, by the client, a first response message from the redirect agent, an identification of a second realm is carried in the first response message, the second realm has a plurality of servers, and wherein the identification of the second realm is set in a redirect field of the first response message received by the client from the redirect agent; and sending, by the client, the request message to a second server in the second realm.

In the method according to an embodiment of the present invention, the identification of the second realm is an identification of a new realm to which the client is to be redirected.

The method further includes: receiving, by the redirect agent, the request message from the client; determining, by the redirect agent, whether the redirect agent is required to redirect the request message from the client to a new realm; and returning the first response message to the client based at least in part on a determination that the redirect agent is required to redirect the request message from the client to the new realm.

In the method according to an embodiment of the present invention, the determining whether the redirect agent is required to redirect the request message from the client to a new realm comprises determining whether the redirect agent is required to send the request message to the second realm according to at least one of a destination realm and a destination host assigned in the request message.

In the method according to an embodiment of the present invention, the sending the request message to the second server in the second realm comprises parsing, by the client, an address of the second server directly when the second server is directly connected to the client; and sending the request message to the second server in the second realm.

In the method according to an embodiment of the present invention, the sending the request message to the second server in the second realm comprises: searching, by the client, for an address of a next hop through the second realm; sending, by the client, the request message to a node of the next hop when the second server is not directly connected to the client; parsing, by the node of the next hop, the address of the second server; and sending, by the node of the next hop, the request message to the second server in the second realm.

The method further includes: receiving, by the second server, the request message from the client; performing, by the second server, a corresponding operation according to the request message; and returning, by the second server, a second response message.

In the method according to an embodiment of the present invention, the performing, by the second server, a corresponding operation according to the request message comprises: executing, by the second server, the request message, or performing, by the second server, redirection on the request message from the client to another server.

In the method according to an embodiment of the present invention, the request message and the first response message are carried in a Diameter protocol.

An embodiment of the present invention provides a client for being redirected by a redirect agent, the client comprises a memory and a processor which are connected to the memory and configured to: send a request message to the redirect agent, the client is directed to a first server in a first realm; receive a first response message from the redirect agent, wherein an identification of a second realm is carried in the first response message, the second realm has a plurality of servers, and the identification of the second realm is set in a redirect field of the first response message received by the client from the redirect agent; and send the request message to a second server in the second realm.

In the client according to an embodiment of the present invention, the identification of the second realm is an identification of a new realm to which the client is to be redirected.

In the client according to an embodiment of the present invention, in sending the request message to the second server in the second realm, the processor is further configured to parse an address of the second server directly when the second server is directly connected to the client, and send the request message to the second server in the second realm.

In the client according to an embodiment of the present invention, in sending the request message to the second server in the second realm, the processor is further configured to search for an address of a next hop through the second realm, send the request message to a node of the next hop when the second server is not directly connected to the client, such that the node of the next hop parses the address of the second server and sends the request message to the second server in the second realm.

An embodiment of the present invention provides a method for redirecting a client that is used to request a redirect agent to assign a different server in a new realm for the client, which comprises: receiving, by the redirect agent, a request message from the client, the client is directed to a first server in a first realm; determining, by the redirect agent, whether the redirect agent is required to redirect the request message from the client to a new realm; and returning a first response message to the client based at least in part on a determination that the redirect agent is required to redirect the request message from the client to the new realm, an identification of a second realm is carried in the first response message, the second realm has a plurality of servers, and the identification of the second realm is set in a redirect field of the first response message returned from the redirect agent to the client, such that the client sends the request message to a second server in the second realm after receiving the first response message from the redirect agent.

In the method according to an embodiment of the present invention, the identification of the second realm is an identification of the new realm to which the client is to be redirected.

In the method according to an embodiment of the present invention, the determining whether the redirect agent is required to redirect the request message from the client to a new realm comprises determining whether the redirect agent is required to send the request message to the second realm according to at least one of a destination realm and a destination host assigned in the request message.

In the method according to an embodiment of the present invention, the request message and the first response message are carried in a Diameter protocol.

An embodiment of the present invention provides a redirect agent, which comprises a memory and a processor which are connected to the memory and configured to: receive a request message from a client, the client is directed to a first server in a first realm; determine whether the redirect agent is required to redirect the request message from the client to a new realm; and return a first response message to the client based at least in part on a determination that the redirect agent is required to redirect the request message from the client to the new realm, an identification of a second realm is carried in the first response message, the second realm has a plurality of servers, and the identification of the second realm is set in a redirect field of the first response message returned from the redirect agent to the client, such that the client sends the request message to a second server in the second realm after receiving the first response message from the redirect agent.

In the redirect agent according to an embodiment of the present invention, the identification of the second realm is an identification of the new realm to which the client is to be redirected.

In the redirect agent according to an embodiment of the present invention, in the determining whether the redirect agent is required to redirect the request message from the client to a new realm, the processor is further configured to determine whether the redirect agent is required to send the request message to the second realm according to at least one of a destination realm and a destination host assigned in the request message.

In the redirect agent according to an embodiment of the present invention, the request message and the first response message are carried in a Diameter protocol.

The solutions of the present invention provide the benefits as follows.

In the solutions of the present invention, the client can be redirected to a realm different from the current realm in the client redirection process.

In the solutions of the present invention, the data are maintained and modified only on the redirect agent, so that the redirection service between different realms can be realized without upgrading or maintaining the client.

In addition, in the solutions of the present invention, because the number of redirect agents is much smaller than the number of clients, the operation and maintenance costs can be reduced greatly.

DETAILED DESCRIPTION

Hereunder embodiments of the present invention will be described in conjunction with the accompanying drawings.

In solutions of the present invention, a client is directed to a server in a realm. Data are maintained and modified on a redirect agent, and the redirect agent sends relevant configuration information and the data to the client. It is unnecessary to upgrade and maintain the client. In the embodiments, the information and data configured on the redirect agent may include information of a new realm to which the client is directed after the redirection, and may also include information of a server in the new realm; the above information may be sent to the client together or partly, so that the client may accomplish the redirection operation according to relevant technologies. Those embodiments are described hereunder in detail.

In an embodiment of the present invention, information of a new realm to which a client is to be redirected is configured on a redirect agent, and the information of the new realm is carried in a response message sent by the redirect agent to the client.

Figure 2:
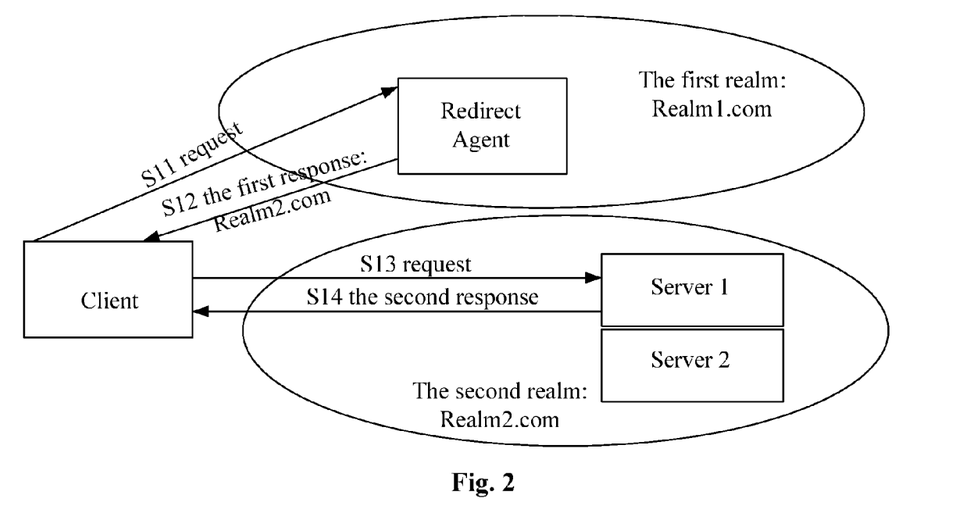
FIG. 2 is a schematic flow chart of client redirection according to an embodiment of the present invention.

As shown in FIG. 2, to redirect the client, the following steps may be performed.

In Step S11, the client sends a request message to the redirect agent.

The client sends a request message to the redirect agent that performs redirection data management for the client, to request for a service or operation.

The request message may be an ordinary service request message, that is, the request message may be initiated with an ordinary service request.

In Step S12, the redirect agent returns a response message to the client, with information of a second realm to which the client is to be redirected carried in the response message.

For example, when receiving the request message from the client, the redirect agent returns a response message, which carries the information of the second realm to be redirected to, to the client according to content of the request message. For instance, in this embodiment, the redirect agent returns the information of the second realm to be redirected to, i.e., Realm2.com.

In this step, when determining the request message has to be sent to a new destination realm according to relevant information in the request message, e.g., destination realm and/or address of destination host, the redirect agent returns a response message carrying information of the new destination realm to the client. When the client receives the response, it may reroute the message with the new destination realm.

For example, an exemplary content of a redirect response message for authorization and authentication is described as follows:

```
<AAA>    ::= < Diameter Header: 275, PXY > //content of Diameter
    header: "275", the command code; "PXY", indicating the message is
    proxiable
        < Session-Id > //indicating the session identifier, which is a copy
            of the session identifier in the request
        { Result-Code } //having a value of "3006" which indicates a
            redirect response
        { Origin-Host } //the name of the host from which this response is
            returned
        { Origin-Realm } //the name of the realm from which this response
            is returned
        {   Redirect-Realm   }//the name of the realm to be redirected to,
            e.g., Realm2.com
```

In Step S13, the client sends the request message to a second server in the second realm to be redirected to.

When receiving the first response message, the client obtains the information of the second realm to be redirected to from the first response message, and sends the request message to the second server in the second realm according to the information of that new realm.

The request message in Step S13 is consistent with the request message in Step S11 in terms of content such as service information, except for the destination address being replaced.

Because the information of the second realm is provided but information of the server to which the client is to be redirected is not provided explicitly, the client takes the second realm to be redirected to as the destination realm for routing that request message. The request message may be handled by any server in the destination realm. The client may choose a server (here, choose between server 1 and server 2) randomly in the second realm, for example, the client chooses to initiate the request to server 1.

In the above process, the client is required to parse the address of server 1 as follows: the client parses the address of server 1 directly in the case that server 1 is connected to the client directly; the client searches for the address of the next hop through the second realm and the address of the server 1 is parsed by another node, in the case that server 1 is not connected to the client directly.

In this step, said another node is a message processing node which may be another server with address resolution function.

In Step S14, the second server in the second realm receives the request message from the client, performs a corresponding operation, and returns a second response message to the client.

The second server chosen by the client in the second realm performs relevant corresponding operation, for example, executing the request, or forwarding or redirecting the request to another server, according to the request message from the client, and returns the second response message to the client to inform the client of the execution result. The second server in the second realm may even perform redirection again on the request from the client.

In another embodiment of the present invention, on the basis of the previous embodiment, the information of the new realm to which the client is to be redirected is configured on the redirect agent; and additionally, information of a new server to which the client is to be redirected is configured on the redirect agent. In addition, the information of the new realm and the information of the new server are carried in the first response message to the client.

Figure 3:
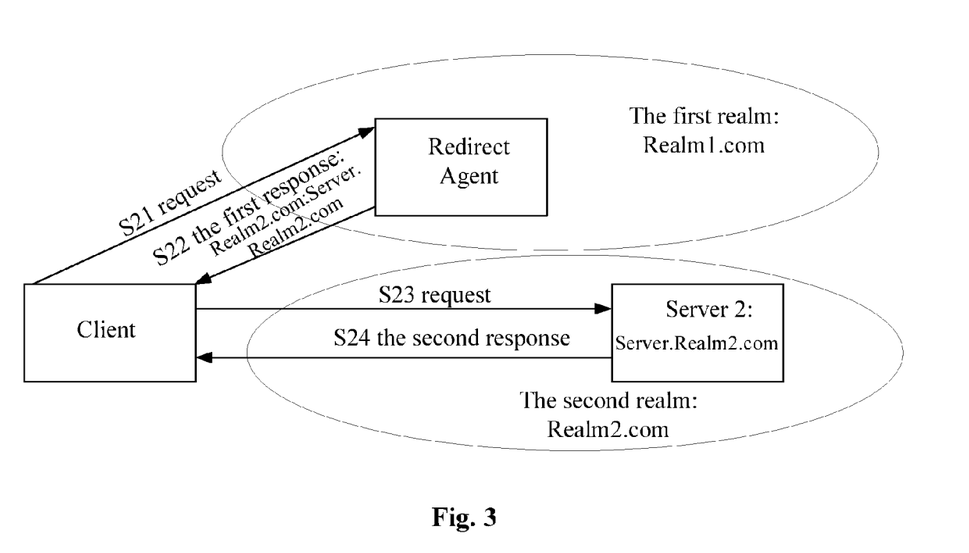
FIG. 3 is a schematic flow chart of client redirection according to another embodiment of the present invention.

FIG. 3 is a schematic flow chart according to the embodiment. As shown in FIG. 3, the redirection process includes the steps as follows.

In Step S21, the client sends a request message to the redirect agent.

The client sends the request message to the redirect agent that performs redirection data management for the client, to request for a service or operation.

In Step S22, the redirect agent returns a first response message to the client, to inform the client of information of the second realm to which the client is to be redirected and the address of the second server to which the client is to be redirected.

When receiving the request message from the client, the redirect agent returns the first response message, which carries the information of the second realm to be redirected to and the information of the second server to be redirected to, to the client according to the content of the request message.

For example, an exemplary content of a redirect response message for authorization and authentication is described as follows:

```
<AAA>  ::= < Diameter Header: 275, PXY > //content of Diameter
  header: "275", the command code; "PXY", indicating the message
  is proxiable
    < Session-Id > //indicating the session identifier, which is a copy
      of the session identifier in the request
    { Result-Code } //having a value of "3006" which indicates a
      redirect response
    { Origin-Host } //the name of the host from which this response is
      returned
    { Origin-Realm } //the name of the realm from which this response
      is returned
    {  Redirect-Host  } //the name of the server to be redirected to,
e.g., Server.Realm2.com
    { Redirect-Realm } //the name of the realm to be redirected to,
      e.g., Realm2.com
```

In Step S23, the client sends the request message to the second server according to the address of the second server and the information of the second realm carried in the first response from the redirect agent.

When receiving the first response message, the client obtains the information of the second realm to which the client is to be redirected from the first response message.

In the case that the address of the second realm to be redirected to and the address of the second server to be redirected to are provided together, the client takes the second realm to be redirected to as the destination realm and the second server to be redirected to as the destination server, and routes the request message to the assigned second server in the second realm. The request may only be handled by the destination second server in the second realm.

In Step S24, the second server in the second realm receives the request message from the client and performs a corresponding operation, for example, executing the request, or forwarding or redirecting the request to another server according to the request. Then the second server returns a second response message to the client.

The second server performs the corresponding operation according to the request message from the client, and according to a result of the operation, returns the second response message to the client to inform the client of the operation result. The second server in the second realm may even perform redirection again on the request from the client.

According to an embodiment of the present invention, an extended redirect realm parameter of Diameter protocol is in a format as follows: Redirect Realm: type: DiameterIdentify (Diameter identification), containing an identification of a new realm to be redirected to.

If a redirect request requests to be redirected to the same realm, this "Redirect Realm" needn't be provided. AVP Code: to be assigned by the standardization organization. AVP Flag: the "M" flag is required, i.e., the AVP is a parameter that must be comprehended.

An exemplary content of a redirect response message for authorization and authentication is described as follows:

```
<AAA>  ::= < Diameter Header: 275, PXY > //content of Diameter
  header: "275", the command code; "PXY", indicating the message
  is proxiable
    < Session-Id > //indicating the session identifier, which is a copy
      of the session identifier in the request
    { Result-Code } //having a value of "3006" which indicates a
      redirect response
    { Origin-Host } //the name of the host from which this response is
      returned
    { Origin-Realm } //the name of the realm from which this response
      is returned
    [  Redirect-Host  ] //the name of the server to be redirected to,
e.g., Server1.china.com
    { Redirect-Realm } //the name of the realm to be redirected to,
      e.g., china.com
```

The code format of Redirect-Realm may be as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                           AVP Code                            |
+-+-+-+-+-+-+-+-+-+-+-+-+-+-+-+-+-+-+-+-+-+-+-+-+-+-+-+-+-+-+-+-+
|V M P r r r r r|                 AVP Length                   |
+-+-+-+-+-+-+-+-+-+-+-+-+-+-+-+-+-+-+-+-+-+-+-+-+-+-+-+-+-+-+-+-+
|    Data ...
+-+-+-+-+-+-+-+-+
```

AVP Code: to be allocated by the standardization organization.
AVP Flag:
V: 0
M: 1
P: 0
r: 0
AVP Length: the length of the parameter, to be filled as required.
Data: filled with the name of the realm to be redirected to.

The parameter is provided in the redirect response to the Diameter request in the case that the Diameter request is to be redirected to a new realm.

Figure 4:
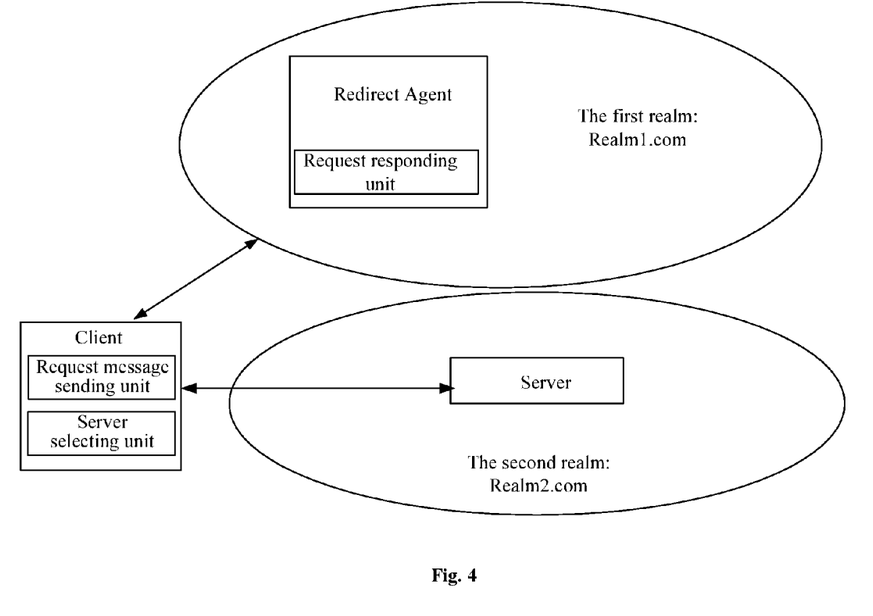
FIG. 4 is a schematic structure diagram of a system according to an embodiment of the present invention.

FIG. 4 is a schematic structure diagram of a system for redirecting a client according to an embodiment of the present invention. As shown in FIG. 4, the system mainly includes a client, a redirect agent that maintains route data for the client, and a server to which the client is directed. The client includes a request message sending unit which is adapted to send a request message to the servers. The redirect agent is provided with a request responding unit which is adapted to return a response message to the client who is directed to a first server in a first realm.

According to an embodiment of the present invention, a second realm identification configuring unit and a second server identification configuring unit are added into the request responding unit to configure relevant redirection information for the client.

Figure 5:
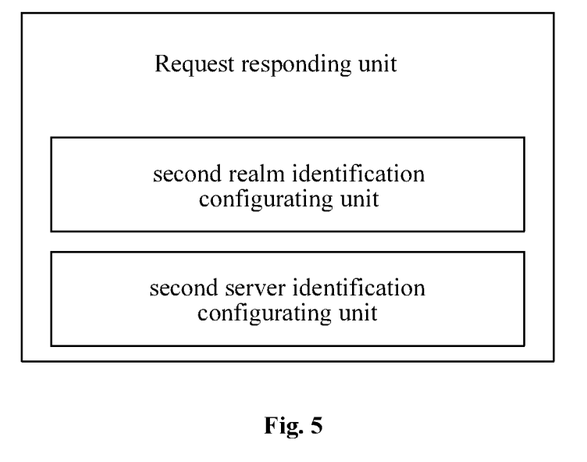
FIG. 5 is a detailed schematic structure diagram of a request responding unit in a redirect agent of a system according to an embodiment of the present invention.

FIG. 5 illustrates a detailed structure of the request responding unit according to an embodiment of the present invention. As shown in FIG. 5, the request responding unit is added with a second realm identification configuring unit, adapted to configure an identification of a second realm into the response message and a second server identification configuring unit, adapted to configure information of a second server into the response message.

The client is provided with a server selecting unit which is adapted to choose a second server in the second realm according to the identification of the second realm carried in the response message.

In the case that the request responding unit doesn't include the second server identification configuring unit, the identification of the second realm is presented in the response message returned to the client, but the identification of the second server is not presented. In such case, it is required to arrange a server selecting unit in the client for choosing a second server in the second realm so as to initiate the redirect request to the second server.

In the embodiments of the present invention, the data are maintained and modified only on the redirect agent, so that the redirection service between different realms may be realized without upgrading or maintaining the client.

In addition, in the embodiments of the present invention, because the number of redirect agents is much smaller than the number of clients, the operation and maintenance costs may be reduced greatly.

It is apparent that various modifications and variations may be made to the present invention by those skilled in the art, without departing from the spirit and the scope of the present invention. The present invention tends to cover the modifications and variations if those modifications and variations fall into the protected scope of the present invention defined by the accompanied claims or their equivalent.

What is claimed is:

1. A method for redirecting a client comprising:
    sending, by the client, a first request message to a redirect agent, wherein identifications of a first realm and a first server in the first realm that the client was originally directed to are respectively indicated in a destination realm field and a destination host field of the first request message, and wherein the redirect agent is configured with information of a second realm to which the client is allowed to be redirected;
    receiving, by the client, a first response message from the redirect agent, wherein an identification of the second realm is indicated in a redirect field of the first response message when the redirect agent determines that the client is to be redirected to the second realm; and
    sending, by the client, a second request message to a second server in the second realm for communicating with the second server directly.

2. The method according to claim 1, further comprising:
    receiving, by the redirect agent, the first request message from the client;
    determining, by the redirect agent, whether the client is to be redirected to the second realm according to the first request message; and
    based on a determination that the client is to be redirected to the second realm, sending, by the redirect agent, the first response message to the client for redirecting the client to the second realm.

3. The method according to claim 2, wherein determining whether the client is to be redirected to the second realm according to the first request message comprises:
    determining, by the redirect agent, whether the client is to be redirected to the second realm according to at least one of the destination realm and the destination host indicated in the first request message.

4. The method according to claim 1, wherein sending the second request message to the second server in the second realm comprises:
    parsing, by the client, an address of the second server when the second server is directly connected to the client; and
    sending the second request message to the second server in the second realm.

5. The method according to claim 1, wherein sending the second request message to the second server in the second realm comprises:
    searching, by the client, for an address of a next hop through the second realm;
    sending, by the client, the second request message to a node of the next hop when the second server is not directly connected to the client;
    parsing, by the node of the next hop, the address of the second server; and
    sending, by the node of the next hop, the second request message to the second server in the second realm.

6. The method according to claim 1, further comprising:
    receiving, by the second server, the second request message from the client;
    performing, by the second server, an operation according to the second request message; and
    returning, by the second server, a second response message.

7. The method according to claim 6, wherein performing, by the second server, the operation according to the second request message comprises:
    executing, by the second server, the operation as indicated by the second request message.

8. The method according to claim 6, wherein performing, by the second server, the operation according to the second request message comprises:

performing, by the second server, a redirection of the client to another server.

9. The method according to claim 1, wherein the first request message and the first response message are carried in a Diameter protocol.

10. A client, comprising:
a memory storing programming instructions; and
a processor connected to the memory and, by executing the programming instructions, configured to:
send a first request message to a redirect agent, wherein identifications of a first realm and a first server in the first realm that the client was originally directed to are respectively indicated in a destination realm field and a destination host field of the first request message, and wherein the redirect agent is configured with information of a second realm to which the client is allowed to be redirected;
receive a first response message from the redirect agent, wherein an identification of the second realm is indicated in a redirect field of the first response message when the redirect agent determines that the client is to be redirected to the second realm; and
send a second request message to a second server in the second realm for communicating with the second server directly.

11. The client according to claim 10, wherein in sending the second request message to the second server in the second realm, the processor is configured to:
parse an address of the second server when the second server is directly connected to the client; and
send the second request message to the second server in the second realm.

12. The client according to claim 10, wherein in sending the second request message to the second server in the second realm, the processor is configured to:
search for an address of a next hop through the second realm; and
send the second request message to a node of the next hop when the second server is not directly connected to the client such that the node of the next hop parses the address of the second server and sends the second request message to the second server in the second realm.

13. A method for redirecting a client, comprising:
receiving, by a redirect agent, a first request message from the client, wherein identifications of a first realm and a first server in the first realm that the client was originally directed to are respectively indicated in a destination realm field and a destination host field of the first request message, and wherein the redirect agent is configured with information of a second realm to which the client is allowed to be redirected;
determining, by the redirect agent, whether to redirect the client to the second realm; and
based on a determination that the client is to be directed to the second realm, sending, by the redirect agent, a first response message to the client, wherein an identification of the second realm is indicated in a redirect field of the first response message, such that the client sends a second request message to a second server in the second realm after receiving the first response message.

14. The method according to claim 13, wherein determining whether to redirect the client to the second realm comprises:
determining whether to redirect the client to the second realm according to at least one of the destination realm and the destination host indicated in the first request message.

15. The method according to claim 13, wherein the first request message and the first response message are carried in a Diameter protocol.

16. A redirect agent comprising:
a memory storing programming instructions; and
a processor connected to the memory and, by executing the programming instructions, configured to:
receive a first request message from a client, wherein identifications of a first realm and a first server in the first realm that the client was originally directed to are respectively indicated in a destination realm field and a destination host field of the first request message, and wherein the redirect agent is configured with information of a second realm to which the client is allowed to be redirected;
determine whether to redirect the client to the second realm; and
based on a determination that the client is to be directed to the second realm, return a first response message to the client wherein an identification of the second realm is indicated in a redirect field of the first response message, such that the client sends a second request message to a second server in the second realm after receiving the first response message.

17. The redirect agent according to claim 16, wherein in determining whether to redirect the client to the second realm, the processor is further configured to:
determine whether to redirect the client to the second realm according to at least one of the destination realm and the destination host indicated in the first request message.

18. The redirect agent according to claim 16, wherein the first request message and the first response message are carried in a Diameter protocol.

* * * * *